United States Patent Office 3,499,084
Patented Mar. 3, 1970

3,499,084
SUBSTITUTED OXAZOLINES, USEFUL AS
PHARMACEUTICALS
George Levitt, Wilmington, Del., assignor to E. I. du Pont
de Nemours and Company, Wilmington, Del., a corporation of Delaware
No Drawing. Filed Aug. 10, 1965, Ser. No. 479,055
Int. Cl. A01n 9/22
U.S. Cl. 424—272  18 Claims This invention relates to substituted aminooxazolines.
More specifically, this invention refers to compounds of the formula

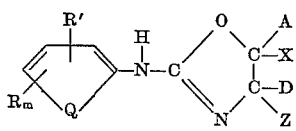

wherein

R and R′ are each separately hydrogen, chlorine or alkyl of 1 through 3 carbon atoms;
R and R′ can be taken together to form a bicyclic ring system;
Q is sulfur or oxygen;
$m$ is 1 or 2;
A, X, D and Z are each separately hydrogen or alkyl of 1 through 4 carbon atoms with the total carbon atoms in A, X, D and Z limited to no more than 8.

It is understood in Formula I that the aminooxazoline moiety can be bonded to either ring of the bicyclic ring system.

The compounds of my invention exhibit valuable pharmacological properties including anti-hypertensive and central nervous depressant activity coupled with unexpectedly low toxicity and outstanding high therapeutic ratios at low rates of use.

PREPARATION

The compounds of Formula I are synthesized by reacting an appropriately substituted aminothiophene or aminofuran with β-chloroethylisocyanate in an inert solvent such as benzene to yield a β-chloroethylurea (Equation A) and converting the urea to the hydrochloride salt of the desired oxazoline by refluxing in water (Equation B). Dropwise addition of ammonium hydroxide to this solution to pH 9 yields the oxazoline as a free base (Equation C).

A.

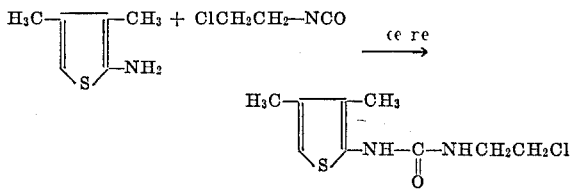

B.

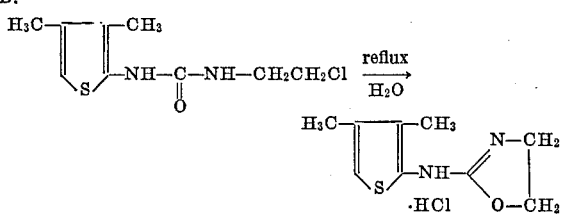

C.

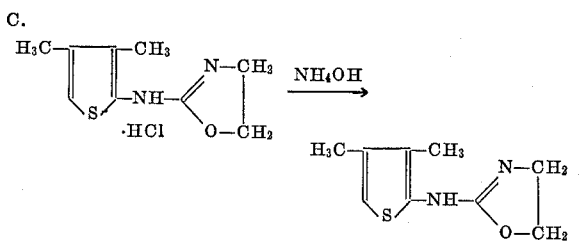

The urea product of Equation A is usually an insoluble solid which can be isolated by filtration. In step B the oxazoline salts are water soluble whereas the by-products are insoluble and are removed by filtration.

Precipitation of the product as a solid in step C is aided by scratching the inside of the container while adding the ammonium hydroxide very slowly.

The oxazoline product is removed by filtration and purified by recrystallization from an organic solvent system such as acetonitrile, isopropylalcohol or benzene-cyclohexane mixture. If the product is an oil or is water soluble, it is separated from the water by extraction with a solvent such as methylene chloride. Then the organic solution is dried over magnesium sulfate, filtered and stripped. The residue thus obtained is the desired free base form of the oxazoline which usually solidifies upon triturating with a small amount of ethyl ether. If the free base does not form a solid readily, the solid hydrochloride salt is obtained by gassing an ether solution of the free base.

Some of the aminothiophenes and aminofurans are vey susceptible to air oxidation and are, therefore, used as their hydrochloride salts. The hydrochloride is neutralized first with aqueous potassium hydroxide and extracted with benzene. The benzene extract is dried thoroughly and then combined with chloroethylisocyanate in benzene to form the urea as in Equation A. Alternatively the urea can be prepared utilizing a thiophene isocyanate or furan isocyanate, prepared according to Equations D and E below, and subsequently reacting it with β-chloroethylamine as in Equation F. The synthesis is then continued as in B and C above.

D.

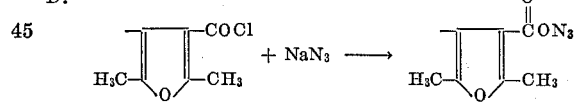

E.

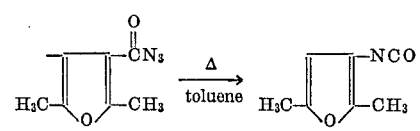

F.

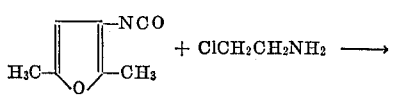

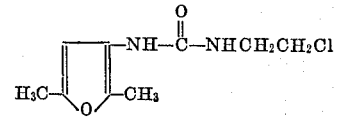

In circumstances where alkyl substitution is desired on the oxazoline ring an appropriately substituted chloroethylisocyanate is used in Equation A or an alkyl substituted chloroethylamine is substituted in Equation F.

The alkyl can be mono-, di-, tri- or tetra- depending upon the meaning of A, X, D and Z.

With reference to the oxazolines of this invention it is specifically intended to include within the purview of the invention, the acid addition salts which these compounds form with acids having pharmaceutically acceptable anions. The term "pharmaceutically acceptable anion" has a definite meaning to one skilled in the art. It is defined as a non-toxic anion of any of the simple acids commercially used to neutralize basic medicinal agents. These acids include, for example, hydrochloric, hydrobromic, hydroiodic, sulfuric, succinic, maleic, tartaric, citric, glycolic and others. The pharmaceutical activity of the molecule is primarily a function of the cation, the anion serving chiefly to supply electric neutrality.

By reference to the reaction described above, it can be seen that in the ordinary practice of the pharmaceutical process of the invention, the oxazolines produced will be hydrobromides, hydrochlorides, hydroiodides, methanesulfonic acids or p-toluenesulfonic acids. These acids can be converted to other pharmaceutically acceptable acids by procedures well known to those skilled in the art. One highly useful method comprises contacting the acid addition salt with a basic anion exchange resin, for example, a highly basic compound such as the one available from Rohm & Haas Company under the name "Amberlite IRA–400." This resin is a polyquaternary ammonium compound which is prepared by chloromethylating a highly cross-linked copolymer of styrene and divinylbenzene followed by treatment of the chloromethylated material with a tertiary amine such as trimethylamine.

To prepare an acid addition salt of this invention, for example, the citrate, the resin is first contacted with an aqueous solution of citric acid whereupon an anion exchange takes place converting the quaternary halide to the citrate. The citrate resin is then contacted with an acid addition salt prepared as described above and a further anion exchange takes place converting the acid addition salt to the citrate and leaving the anion of the original salt on the resin. The citrate salt can be recovered from the eluate by a number of methods such as evaporation or solvent precipitation. This same procedure can be used to prepare nitrates, sulfates, acetates, and other acid addition salts.

The agents of this invention can be administered alone but are generally administered with a pharmaceutically acceptable inert carrier selected on the basis of the chosen route of administration and standard pharmaceutical practice. For example, they can be administered orally in the form of tablets or capsules containing such excipients as starch, milk sugar, certain types of clay, etc. They can be administered orally in the form of elixers or oral suspensions which can contain coloring and flavoring agents. They can be injected parenterally and for this use can be prepared in the form of sterile aqueous solutions containing other solutes such as saline or glucose in sufficient quantity to make the solution isotonic. For intramuscular administration compositions of the compounds of this invention can be prepared in an oil base such as peanut or sesame oil.

The compounds of this invention will be administered in a dosage generally of the same or lower order of magnitude as with other pharmaceutical agents having the same type of desired activity. In certain instances it can be found that because of their high order of activity the optimum dosage of the compounds of this invention will be lower than the optimum dosage of other compounds generally recommended for the same use. In general, the physician or veterinarian will determine the dosage which will be most suitable for a particular application, and as might be expected, it will vary with the age, weight and general health of the patient under treatment and with various other factors which will be determined by the physician or veterinarian in attendance. When they are administered orally a larger quantity will be required to produce the same effect as a smaller quantity given parenterally. Parenteral administration of from 0.1 mg. to 250 mg. of active agent is a suitable pharmacologically effective amount.

The compositions of this invention can take a variety of forms. Various diluents can be employed and the percentage of active ingredients can be varied. It is necessary that an active ingredient form a proportion of the composition such that a suitable dosage form will be obtained. Obviously several dosage unit forms can be administered at about the same time. Although compositions with less than 0.005% by weight of active ingredients are suitable, it is preferred to use compositions containing not less than 0.005% of the active agent because otherwise the amount of carrier becomes excessively large. Activity increases with the concentration of the active agent. The percentage by weight of the active agent can be 10, 50, 75, 95% or even higher. Dosage unit forms can be prepared with a minor proportion of a carrier and a major proportion of active materials and vice-versa.

Administration can be by vapor or spray applications through the mouth and nasal passages.

The following additional examples are given solely for the purpose of illustration and are not to be construed as limitations of this invention, many variations of which are possible without departing from the spirit or scope thereof.

EXAMPLE 1

2-(2,5-dimethylthien-3-ylamino)-2-oxazoline

Part A.—The urea intermediate: Six and eight-tenths grams of 3-amino-2,5-dimethylthiophene hydrochloride is placed in a mixture of 10 g. of potassium hydroxide and 50 ml. of water and 50 ml. of benzene under nitrogen and stirred for fifteen minutes. The benzene solution is separated from the lower phase, dried over potassium hydroxide pellets and decanted into a solution containing 25 ml. of benzene and 0.05 mole of chloroethyl isocyanate. The desired urea intermediate (7.5 g.) is obtained as a yellow precipitate, M.P. 130–132° C.

Part B.—Ring closure to the oxazoline: To 300 ml. of boiling water is added 5.5 g. of the urea obtained above. The mixture is boiled for twenty minutes, cooled, filtered and the filtrate is made alkaline slowly with ammonium hydroxide while the inside of the container holding the filtrate is scratched to aid solid formation. The tan precipitate thus obtained is filtered off to yield 2.7 g. (43%) of the desired product, M.P. 90–92° C.

Analysis.—Calcd. for $C_9H_{12}N_2OS$: C, 55.2; H, 6.17; N, 14.28. Found: C, 55.40; H, 6.33; N, 13.98.

EXAMPLES 2–13

The following compounds are synthesized in like manner by substituting the obvious corresponding starting material for the starting materials of Example 1.

(2) 2-(2-chloro-3,4-dimethylthien-5-ylamino)-2-oxazoline.
(3) 2-(2-chloro-3-methylthien-4-ylamino)-2-oxazoline.
(4) 2-(2,4-dimethylfuran-3-ylamino)-2-oxazoline.
(5) 2-(2,5-dimethylfuran-3-ylamino)-2-oxazoline.
(6) 2-(3,4-dimethylthien-2-ylamino)-2-oxazoline.
(7) 2-(2,4-dimethylthien-3-ylamino)-2-oxazoline.
(8) 2-(2-ethylthien-3-ylamino)-2-oxazoline.
(9) 2-(2-chloro-3,4-dimethylthien-5-ylamino)-4,5-dimethyl-2-oxazoline.
(10) 2-(2,4-dimethylthien-3-ylamino)-4-ethyl-2-oxazoline.
(11) 2-(2,5-dimethylfuran-3-ylamino)-5-butyl-2-oxazoline.
(12) 2-(3,4,5-trimethylthien-2-ylamino)-4-isopropyl-5,5-diethyl-2-oxazoline.
(13) 2-(2-ethylthien-3-ylamino)-4,4,5,5-tetraethyl-2-oxazoline.

EXAMPLE 14

2-(4,5,6,7-tetrahydro-1-benzothiophen-4-ylamino)-2-oxazoline

Part A.—The urea intermediate: To a solution containing 75 ml. of benzene and 0.15 mole of chloroethylisocyanate is added a solution of 15.3 g. (0.1 mole) of 4,5,6,7-tetrahydro-1-benzothiophen-4-ylamino in 25 ml. of benzene. The desired urea (6.8 g.) is obtained as a precipitate M.P. 136–139° C.

Part B.—Ring closure to the oxazoline: The 6.8 g. of urea is placed in 450 ml. of boiling water, boiled for twenty minutes, cooled and filtered. Ammonium hydroxide is added slowly, with scratching to the filtrate to cause precipitation of the weakly basic oxazoline. The product is removed by filtration to yield 5.0 g. (18% overall yield) M.P. 138–144° C.

Analysis.—Calcd. for $C_{11}H_{14}N_2OS$: C, 59.9; H, 5.99; N, 12.69. Found: C, 59.55; H, 6.52; N, 12.49.

EXAMPLES 15–31

The following compounds are synthesized in like manner by substituting the obvious corresponding starting materials for the starting materials of Example 14.

(15) 2-(4,5,6,7-tetrahydro-2-benzothiophen-1-ylamino)-2-oxazoline.
(16) 2-(4,5,6,7-tetrahydro-1-benzothiophen-1-ylamino)-2-oxazoline.
(17) 2-(4,5,6,7-tetrahydro-1-benzothiophen-7-ylamino)-2-oxazoline.
(18) 2-(4,5,6,7-tetrahydro-2-benzothiophen-4-ylamino)-2-oxazoline.
(19) 2-(4,5,6,7-tetrahydro-1-methyl-2-benzothiophen-3-ylamino)-2-oxazoline.
(20) 2-(4,5,6,7-tetrahydro-2-methyl-1-benzothiophen-3-ylamino)-2-oxazoline.
(21) 2-(4,5,6,7-tetrahydro-4-methyl-2-benzothiophen-1-ylamino)-2-oxazoline.
(22) 2-(4,5,6,7-tetrahydro-3-methyl-1-benzothiophen-2-ylamino)-2-oxazoline.
(23) 2-(4,5,6,7-tetrahydro-2-chloro-1-benzothiophen-3-ylamino)-2-oxazoline.
(24) 2-(4,5,6,7-tetrahydro-2-benzofuran-1-ylamino)-2-oxazoline.
(25) 2-(4,5,6,7-tetrahydro-2-benzofuran-4-ylamino)-2-oxazoline.
(26) 2-(4,5,6,7-tetrahydro-1-benzofuran-7-ylamino)-2-oxazoline.
(27) 2-(4,5,6,7-tetrahydro-2-benzofuran-4-ylamino)-4,5-dimethyl-2-oxazoline.
(28) 2-(4,5,6,7-tetrahydro-2-benzofuran-1-ylamino)-4,4-diethyl-5-isopropyl-2-oxazoline.
(29) 2-(4,5,6,7-tetrahydro-2-benzofuran-1-ylamino)-4-propyl-2-oxazoline.
(30) 2-(4,5,6,7-tetrahydro-2-benzofuran-1-ylamino)-4,4,5,5-tetramethyl-2-oxazoline.
(31) 2-(4,5,6,7-tetrahydro-2-benzofuran-1-ylamino)-4,5-di-tert-butyl-2-oxazoline.

Compounds of my invention can be combined with anticholinergics as set forth in an application assigned to my assignee, Ser. No. 348,291 filed Feb. 28, 1964. The mixtures obtained also exhibit central nervous system depressant activity. The oxazolines of this invention can be combined with the anticholinergics of the aforementioned application at like rates and can be applied to animals in like manner.

EXAMPLE 32

A large number of unit capsules are prepared for oral administration by mixing the following ingredients:

| | Parts by weight |
|---|---|
| 2-(4,5,6,7-tetrahydro-2-benzothionphen-1-ylamino)-2-oxazoline | 2,000 |
| Lactose, U.S.P. | 7,950 |
| Dry pyrogenic silica $SiO_2$ with particle size of 0.015 microns, surface area of 200 m.²/gm., and bulk density of 2.2 lbs./cu. ft. ("Cab-O-Sil," Cabot Corp.) | 50 |

After mixing, the mixture is screened through a 40 mesh screen and encapsulated in No. 3 two-piece hard gelatin capsules.

EXAMPLE 33

The active ingredient of Example 32 (20 parts by weight) is dispersed in 100 parts by volume of corn oil and encapsulated in standard soft gelatin capsules.

EXAMPLE 34

Tablets for oral administration are prepared by mixing 50 milligrams of the active ingredient of Example 32, 2.5 milligrams of gelatin, 2.5 milligrams of magnesium stearate and 100 milligrams of starch, and forming the mixture into tablets by a conventional tableting machine. Slow release pills and tablets can also be used.

EXAMPLE 35

A parenteral composition suitable for administration by injection is prepared by dissolving 5% by weight of the active ingredient of Example 32 in 95% by volume of physiological saline and sterilizing the resultant solution by filtration. A buffer can be used if desired.

EXAMPLE 36

A composition suitable for aerosolization is prepared by dissolving 5% by weight of 2-(4,5,6,7-tetrahydro-2-benzothiophen-1-ylamino)-2-oxazoline in 95% by volume of methylene dichloride.

The above examples can be repeated by substituting other compounds within the scope of this invention for the amino-oxazoline of the examples. Thus, compounds of Examples 1–31 can be used.

EXAMPLE 37

Mice are injected via the tail vein with 2-(4,5,6,7-tetrahydro-2-benzothiophen-7-ylamino)-2-oxazoline, formulated as in Example 32 at a dosage of 0.1 mg./kg. of active ingredient. Marked central nervous system depression results as exemplified by depression of spontaneous motor activity for several hours. Toxicity occurs at such dosages that a therapeutic ratio of 50 or more is obtained.

EXAMPLE 38

Beagle dogs are injected via the cephalic vein with the 2-(4,5,6,7-tetrahydro-2-benzothiophen-1-ylamino)-2-oxazoline, formulated as in Example 32, at a dosage of 1.6 mg./kg. Central nervous system depression results as shown by sedation, decreased locomotor activity, and inability to perform sustained physical exercise. Recovery of normal function occurs in about one hour.

EXAMPLE 39

Cats are given intravenous administration of the 2-(4,5,6,7-tetrahydro-2-benzothiophen-7-ylamino)-2-oxazoline, 0.5 mg./kg., formulated as in the composition of Example 35. Central nervous system depression results promptly as shown by decreased locomotor activity, ataxia, and difficulty in maintenance of posture. Recovery without injurious after-effects occurs in a few hours.

EXAMPLE 40

A male rhesus monkey is given via the femoral vein an injection of the 2-(2,5-dimethylthien-3-ylamino)-2-oxazoline acid, formulated as in Example 35, at a dosage of 1.0 mg./kg. Central nervous system depression occurs and the animal becomes sedated and briefly prostrated.

Toxicity occurs at such doses that a therapeutic ratio of 30 or more is obtained.

EXAMPLE 41

Rhesus monkeys are confined in a dynamic exposure chamber into which the composition of Example 38 is aerosolized so that a CT 5000 value (C=concentration in micrograms per liter; T=time in minutes) of the 2-(4,5,6,7-tetrahydro-2-benzothiophen-1-ylamino) - 2 - oxazoline is maintained for five minutes. The animals show central nervous system depression and become ataxic and very quiescent. Recovery is uneventful.

EXAMPLE 42

Mongolian gerbils are placed in a 16-liter semidynamic exposure chamber into which the 2-(4,5,6,7-tetrahydro-1-benzothiophen-4-ylamino)-2-oxazoline, formulated as in Example 37, was aerosolized so that the animals were exposed to 3000 CT for one minute. The gerbils show marked depression and decreased locomotor activity for about one hour after treatment.

EXAMPLE 43

Mice are placed in a 2.85-liter bell-jar chamber into which an acetone solution of the 2-(4,5,6,7-tetrahydro-1-benzofuran-4-ylamino)-2-oxazoline is aerosolized so that the animals are exposed to a nominal 8000 CT of the compound for two minutes. Pronounced central nervous system depression occurs as shown by absence of locomotor activity by the mice as measured in a Woodard activity cage counter 20 minutes after exposure. Recovery is normal and no toxicity occurs at CT values 25 times greater than that used.

EXAMPLE 44

Rats are treated intramuscularly with 2-(4,5,6,7-tetrahydro-1-benzothiophen-4-ylamino)-2-oxazoline at a dosage of 2 mg./kg. In a few minutes central nervous system depression results, as exemplified by ataxia and decrease in spontaneous motor activity. Toxicity occurs at such doses that a therapeutic ratio of 30 or more is obtained.

EXAMPLE 45

The 2-(2,5 - dimethylfuran - 3 - ylamino)-2-oxazoline, administered as the composition of Example 35 intraperitoneally to mice, produces central nervous depression exemplified by decreased locomotor activity and decreased placing reflex. Toxicity occurs at such doses that a therapeutic ratio of 30 or more is obtained.

EXAMPLE 46

The 2 - (2,4 - dimethylthien - 3-ylamino)-2-oxazoline is administered subcutaneously to rats at a dosage of four mg./kg. Central nervous system depression characterized by abnormal gait and decreased spontaneous activity results. Toxicity occurs at such doses that a therapeutic ratio of 20 or more is obtained.

EXAMPLE 47

A rhesus monkey is given by stomach tube 2-(2,3-dimethylthien - 4 - ylamino) - 2-oxazoline in the composition of Example 33. A dosage of five mg./kg. is used. Marked sedation for several hours followed by normal recovery is observed.

The above and similar examples can be carried out in accordance with the teachings of this invention, as will be readily understood by persons skilled in the art, by substitution of components and amounts in place of those specified.

What is claimed is:
1. A compound of the formula wherein
R and R' are each separately selected from the group consisting of hydrogen, chlorine and alkyl of 1 through 3 carbon atoms;
Q is selected from the group consisting of oxygen and sulfur;
$m$ is a whole integer less than 3;
A, X, D and Z are each separately selected from the group consisting of hydrogen and alkyl of 1 through 4 carbon atoms with the limitation that the total number of carbon atoms in A, X, D and Z is less than 9; and R and R' can be joined to form a bicyclic ring system.
2. 2-(2,5-dimethylthien-3-ylamino)-2-oxazoline.
3. 2-(3-methylthien-2-ylamino)-2-oxazoline.
4. 2-(2,4-dimethylfuran-3-ylamino)-2-oxazoline.
5. 2-(2,5-dimethylfuran-3-ylamino)-2-oxazoline.
6. 2-(3,4-dimethylthien-2-ylamino)-2-oxazoline.
7. 2-(2,4-dimethylthien-3-ylamino)-2-oxazoline.
8. 2-(2-ethylthien-2-ylamino)-2-oxazoline.
9. 2 - (4,5,6,7 - tetrahydro - 2 - benzothiophen-1-ylamino)-2-oxazoline.
10. 2 - (4,5,6,7 - tetrahydro - 1-benzothiophen-3-ylamino)-2-oxazoline.
11. 2 - (4,5,6,7 - tetrahydro - 1-benzofuran-3-ylamino)-2-oxazoline.
12. 2 - (4,5,6,7 - tetrahydro - 2-benzofuran-1-ylamino)-2-oxazoline.
13. 2 - (4,5,6,7 - tetrahydro - 1-benzofuran-4-ylamino)-2-oxazoline.
14. 2 - (4,5,6,7 - tetrahydro - 1-benzothiophen-3-ylamino)-2-oxazoline.
15. 2 - (4,5,6,7 - tetrahydro - 1-benzothiophen-4-ylamino)-2-oxazoline.
16. 2 - (4,5,6,7 - tetrahydro - 1 - benzothiophen-7-ylamino)-2-oxazoline.
17. Method of effecting central nervous system depression comprising administering a pharmacologically effective amount of a compound according to claim 1 to a warm-blooded animal.
18. A pharmaceutical composition containing a pharmacologically effective amount of a compound according to claim 1 and a major amount of a pharmacologically acceptable diluent.

References Cited
UNITED STATES PATENTS 2,870,160  1/1959  Bloom et al. _____ 260—307

OTHER REFERENCES

Bloom et al.: J. Am. Chem. Soc., vol. 79, p. 5072, (1957).

LELAND A. SEBASTIAN, Primary Examiner

U.S. Cl. X.R.

260—307